US007483702B2

(12) United States Patent
Yeo et al.

(10) Patent No.: US 7,483,702 B2
(45) Date of Patent: Jan. 27, 2009

(54) CELL RESELECTION FOR IMPROVING NETWORK INTERCONNECTION

(75) Inventors: Whui Mei Yeo, Salo (FI); Lars Dalsgaard, Oulu (FI)

(73) Assignee: Nokia Corporation, Espoo (FI)

( * ) Notice: Subject to any disclaimer, the term of this patent is extended or adjusted under 35 U.S.C. 154(b) by 441 days.

(21) Appl. No.: 10/970,827

(22) Filed: Oct. 20, 2004

(65) Prior Publication Data

US 2006/0084443 A1 Apr. 20, 2006

(51) Int. Cl.
*H04Q 7/20* (2006.01)

(52) U.S. Cl. ....................... 455/449; 455/445; 455/436; 455/437

(58) Field of Classification Search ................. 455/449, 455/443, 436–437, 444–446
See application file for complete search history.

(56) References Cited

U.S. PATENT DOCUMENTS 5,740,535 A 4/1998 Rune
6,501,951 B2 * 12/2002 Moore ........................ 455/434
2004/0043769 A1 3/2004 Amerga et al.
2004/0082328 A1 * 4/2004 Japenga et al. .............. 455/436
2004/0192313 A1 9/2004 Otting

OTHER PUBLICATIONS

3GPP TS 43.022 V6.0.0 http.//www.3gpp.org, 2002, no month listed.
3GPP TS 25.304 V5.6.0 http.//www.3gpp.org, 2004, no month listed.
3GPP TS 45.008 V6.9.0 http.//www.3gpp.org, 2004, no month listed.
3GPP TS 24.008 V6.6.0 http.//www.3gpp.org, 2004, no month listed.
3GPP TS 44.060 V6.9.0 http.//www.3gpp.org, 2004, no month listed.
3GPP TS 25.331 V6.2.0 http.//www.3gpp.org, 2004, no month listed.

* cited by examiner

*Primary Examiner*—Lester Kincaid
*Assistant Examiner*—Sayed T Zewari
(74) *Attorney, Agent, or Firm*—Ware, Fressola, Van Der Sluys & Adolphson LLP

(57) ABSTRACT

This invention describes a new methodology for a cell reselection by a mobile station (MS) for improving network interconnection and interoperability in a limited mobile access environment. The invention is applicable to any kind of networks and their interconnections. The invention describes how the MS can better recover from failed intersystem cell reselection attempts so that there are fewer subsequent failed attempts using two major improvements. First, the MS takes into consideration during cell reselection evaluation and candidate-cell selection, whether the MS had previously been unsuccessful in reselecting the considered cell. This means treating neighbor cells to which the MS had failed reselection before with a lower priority in subsequent cell reselection evaluations. Second, the MS is allowed to stop monitoring and thus, to stop evaluating cells if it was earlier found that the access to those cells is forbidden.

21 Claims, 4 Drawing Sheets

CELL RESELECTION FOR IMPROVING NETWORK INTERCONNECTION

TECHNICAL FIELD

This invention generally relates to mobile communications and more specifically to cell reselection for improving network interconnection and interoperability.

BACKGROUND ART

There are two aspects to the problem faced by current GSM-UTRAN (global system for mobile communications-universal terrestrial radio access network) capable MS (mobile station) roaming in a GSM-UTRAN network environment. One aspect is that the MS may keep trying to reselect the same cell (e.g., UTRAN cell) that was already found to be unsuitable. The other aspect is the MS is wasting power resources by monitoring cells which it has no access to. These two situations are elaborated below.

The first situation is when the MS is trying to reselect the same unsuitable cell (e.g., the UTRAN cell). Currently, a 3GPP (Generation Partnership Project)-standardized inter-RAT (radio access technology) capable MS monitors cells of other radio access technologies for MS-based cell reselection evaluation when they are provided in a network-defined neighbor list. When the radio based criteria for reselecting another radio access technology cell are met, the MS may attempt to reselect a particular best cell if it is suitable. Details of the algorithm for cell reselection (using defining a ranking quantity, e.g., having the greatest received signal code power (RSCP), to specify the best cell), according to the prior art, e.g., from GSM to UTRAN, are provided in "3rd Generation Partnership Project; Technical Specification Group GSM/EDGE Radio Access Network; Radio subsystem link control", 3GPP TS 45.008, section 6.6.5.

If the conditions for successful camping onto the cell are not met (e.g., not a suitable cell or the access on the cell is forbidden), the MS may return to the originating radio access technology (e.g., GSM), where it starts measuring and evaluating other radio access technology cells that are provided in a network-defined neighbor list again. The same cell that was earlier tried may still be evaluated as the best cell such that the MS tries to reselect to this cell again only to find out again that it is not able to camp onto it. The MS returns to the originating radio access technology and the cycle perpetuates. FIG. 1 illustrates the situation when a mobile station is trying to reselect the same unsuitable cell, per prior art. Thus, the prior art does not provide any guidance on how the MS could handle this situation.

The second situation is when the MS is wasting power resources by monitoring forbidden access cells (e.g., the UTRAN cell). In particular, to find out if an access is allowed on a cell with no history of the forbidden access cells in 3GPP cellular systems, the MS has to perform a location update procedure in order to register to the network. When the MS gets a Location Update Reject message from the network with reject cause values #13 or #15, this means that MS access on this cell is forbidden. According to "3rd Generation Partnership Project; Technical Specification Group Core Network; Mobile radio interface Layer 3 specification; Core network protocols; Stage 3", 3GPP TS 24.008, 4.4.4.7, the MS shall then store the Location Area Identity (LAI) on a list of "forbidden location areas for roaming". This information is used in the future cell selection attempts where the MS is able to check if a target cell is not belonging to a forbidden LAI. This check is one of the criteria that needs to be met for a suitable cell. However, the LAI information is not sufficient to uniquely identify a cell. More than one cell in an area may have the same LAI. Thus, it is possible that the MS is continuously measuring the same cell or cells belonging to the same forbidden LAI when the MS only stores the LAI.

In certain network environment, in particular shared cellular networks, due to the changed business conditions, it is increasingly common to find an operator operating only a WCDMA network and having a roaming agreement with another operator owning another radio access technology network to extend the coverage, e.g., Hutchinson 3 subscribers roam in Austria's Mobilkom GSM network. The latter operator may also operate its own WCDMA network which is not accessible to the roaming partner's subscribers and vice versa. The network-defined neighbor list may only contain cells which the partner's subscribers have no access to. The reason why such an MS ends up receiving such a list is because this information is broadcasted to all MS camped on the same cell.

It is possible for the network to use existing signaling mechanisms to customize a measurement trigger threshold and neighbor list for a particular MS such that it will not monitor such cells under certain conditions, which requires the network to have very tight control over the MS mobility which may not be practical from the implementation point of view in terms of the complexity and signaling load. From the network operator implementation point of view, the easiest way would be for all MS camped onto this cell to use the broadcast-defined neighbor list to measure the cells. Since it is possible that the subscribers camped on the cell may be the owner operator's subscribers and/or its roaming partner's subscribers due to the shared network, the measurement threshold can be also set such that the MS will measure the cells, if the network does not want to specially customize the settings for a particular MS. The end result is the roaming partner's subscriber terminals end up measuring and evaluating cells which they have no access to, i.e., cells belonging to a forbidden LAI.

For the MS to obtain information on whether the target UTRAN cell, i.e., the cell to be reselected to, is suitable or to find out if the access is allowed, means that there is a period of time where the MS is not able to provide service to the end user in terms of missing incoming call pagings, inability to process mobile-originated call requests and disruptions in data transfers.

Even though the MS had already "discovered" that all cells of a particular LAI are forbidden, it still needs to read the system information messages of the target cell to obtain the LAI. Thus, it is not possible to avoid the gap in service availability, unless the implementation uses a dual GSM & WCDMA radio frequency (RF) receiver hardware—one RF for each RAT—but this is not cost effective and increases the number of components for manufacturing. A number of these components increases even more if there is another cellular RAT, e.g., CDMA2000, incorporated in a phone product.

At least in the context of a GSM to WCDMA cell reselection and 2G-2G cell reselection, currently the MS monitors such cells because they have been provided in the network-defined neighbor list. It may not end up reselecting such cells after the first location update attempt on the cell due to the suitability criteria not being met, but it continues to measure and evaluate these cells. The successful evaluation of these cells based on the radio criteria would trigger the MS to check the suitability of the cell. To check this, the MS needs to receive the system information messages of the target cell which would cause a short gap in service availability for a shared GSM/WCDMA radio frequency receiver hardware implementation.

FIG. 2 shows a flow chart illustrating how a mobile station is wasting resources in monitoring forbidden access cells, per prior art, as described above.

DISCLOSURE OF THE INVENTION

The object of the present invention is to provide a methodology for cell reselection by a mobile station (MS) for improving network interconnection and interoperability in a limited mobile access environment.

According to a first aspect of the invention, a method for a cell reselection by a mobile station for interconnecting the mobile station to a network in a limited mobile access environment, comprises the steps of: receiving by the mobile station from the network a cell-list signal indicative of a list of cells located in a radio-sensitive geographical area of the mobile station for determining using a predetermined procedural criterion whether any of the cells can be used for interconnecting the mobile station to the network and optionally generating by the mobile station a modified list of cells from the list by removing forbidden access cells from the list; choosing one cell from the list or optionally from the modified list using a predetermined criterion, wherein the one cell meets a radio-based pre-selected criterion; checking by the mobile station if the one cell was previously unsuccessfully reselected for the interconnection; and reselecting the one cell if the one cell was not previously unsuccessfully reselected, and after the determining, if the predetermined procedural criterion is met for the one cell, using the one cell by the mobile station for interconnecting the mobile station to the network in the limited mobile access environment.

According further to the first aspect of the invention, all the steps performed by the mobile station may be coordinated by a cell reselection block of the mobile station.

Further according to the first aspect of the invention, before the step of obtaining by the mobile station from the network the list of cells, the method may comprise the step of: camping by the mobile station on a cell from the radio-sensitive geographical area using a camp-on signal provided by the mobile station to the cell, wherein the cell is used for obtaining the list from the network by the mobile device.

Still further according to the first aspect of the invention, before the step of choosing the one cell, the method may comprise the step of: narrowing down by the mobile station the list or the modified list by removing cells from the list or from the modified list which do not meet the radio-based criterion. Still further, the step of the choosing of the one cell from the list or optionally from the modified list may be based on ranking the cells according to the predetermined criterion.

According further to the first aspect of the invention, the step of the reselecting the one cell may include: camping by the mobile station on the one cell using a further camp-on signal provided by the mobile station to the one cell; performing by the mobile station and by the network testing using the predetermined procedural criterion whether the one cell can be used for interconnecting the mobile station to the network; and connecting the mobile station to the network using the one cell if the predetermined procedural criterion is met.

According still further to the first aspect of the invention, if the one cell does not meet the predetermined procedural criterion, the method may further comprise the steps of: choosing a further cell from the list or optionally from the modified list using a predetermined criterion, wherein the further cell meets a radio-based pre-selected criterion; checking by the mobile station if the further cell was previously unsuccessfully reselected for the interconnection; and reselecting the further cell if the one cell was not previously unsuccessfully reselected, and after the determining, if the predetermined procedural criterion is met, using the further cell by the mobile station for interconnecting the mobile station to the network in the limited mobile access environment.

According further still to the first aspect of the invention, if the one cell does not meet the predetermined procedural criterion, the method may further comprises the step of: storing by the mobile terminal cell identity information for the one cell to prevent the choosing of the one cell based on a predetermined rejection criterion, optionally during a predetermined time period, wherein the cell identity information includes cell information uniquely identifying the one cell and optionally a location area identity of the one cell. Still further, the method may further comprise the step of: removing from the storing the cell identity information of the one cell by the mobile terminal if the predetermined rejection criterion is no longer applied, optionally after the predetermined time period.

According to a second aspect of the invention, a mobile station for interconnecting to a network in a limited mobile access environment using a cell reselection by a mobile station, comprises: a receiving/transmitting/processing module, responsive to a cell-list signal indicative of a list of cells located in a radio-sensitive geographical area of the mobile station, for providing a cell-list received signal indicative of the list of the cells to be used for determining using a predetermined procedural criterion whether any of the cells can be used for interconnecting the mobile station to the network; a cell reselection block, responsive to the cell-list received signal, optionally for generating a modified list of cells from the list by removing forbidden access cells from the list, for choosing one cell from the list or optionally from the modified list using a predetermined criterion, wherein the one cell meets a radio-based pre-selected criterion, for reselecting the one cell if the one cell was not previously unsuccessfully reselected, wherein, after the determining indicating that the predetermined procedural criterion is met for the one cell, the one cell is used by the mobile station for interconnecting the mobile station to the network in the limited mobile access environment.

According further to the second aspect of the invention, before receiving the cell-list signal containing the list of cells, the cell reselection block may provide a camp-on originated signal which is transformed to a camp-on signal by the receiving/transmitting/processing module and the camp-on signal may be used for camping of the mobile device on a cell from the radio-sensitive geographical area, wherein the cell may be used for obtaining the list from the network by the mobile device. Still further, before the choosing the one cell, the cell reselection block may narrow down the list or the modified list by removing cells from the list or from the modified list which do not meet the radio-based criterion.

Further according to the second aspect of the invention, the cell reselection block may further provide a further camp-on originated signal which is transformed to a further camp-on signal by the receiving/transmitting/processing module and the further camp-on signal may be used to camp the mobile device on the one cell for performing by the mobile station, optionally using the cell reselection block, and by the network testing based on the predetermined procedural criterion whether the one cell can be used for interconnecting the mobile station to the network.

Still further according to the second aspect of the invention, if the one cell does not meet the predetermined procedural criterion, the cell reselection block may choose a further cell from the list or optionally from the modified list using a predetermined criterion, wherein the further cell meets a radio-based pre-selected criterion, and may reselect the further cell if the further cell was not previously unsuccessfully reselected, and wherein, after the determining indicating that the predetermined procedural criterion is met for the further cell, using the further cell by the mobile station for interconnecting the mobile station to the network in the limited mobile access environment.

According further to the second aspect of the invention, the mobile station may further comprise: a memory, for storing the list, the modified list and information on forbidden access cells. Still further, the choosing of the one cell from the list or optionally from the modified list may be based on ranking the cells according to the predetermined criterion performed by the cell reselection block, wherein the ranking information is stored in the memory. Yet still further, if the one cell does not meet the predetermined procedural criterion, cell identity information of the one cell may be stored in the memory to prevent the choosing of the one cell based on a predetermined rejection criterion, optionally during a predetermined time period, wherein the cell identity information includes cell information uniquely identifying the one cell and optionally a location area identity of the one cell. Yet further still, the cell identity information of the one cell may be removed from the memory if the predetermined rejection criterion is no longer applied, optionally after the predetermined time period.

According to a third aspect of the invention, a system utilizing a cell reselection by a mobile station for interconnecting the mobile station to a network in a limited mobile access environment, comprises: a mobile station, responsive to a cell-list signal indicative of a list of M cells located in a radio-sensitive geographical area of the mobile station, for determining using a predetermined procedural criterion whether any of the cells can be used for interconnecting the mobile station to the network and optionally for generating a modified list of cells from the list by removing forbidden access cells from the list, for choosing one cell from the list or optionally from the modified list using a predetermined criterion, wherein the one cell meets a radio-based pre-selected criterion, for checking if the one cell was previously unsuccessfully reselected for the interconnection, for reselecting the one cell if the one cell was not previously unsuccessfully reselected, and after the determining, if the predetermined procedural criterion is met for the one cell, for using the one cell for interconnecting the mobile station to the network in the limited mobile access environment, wherein M is an integer of at least a value of two; K sub-networks containing the M cells, wherein K is an integer of at least a value of one; and a network, for providing the cell-list signal.

According further to the third aspect of the invention, the cell-list signal may be provided by a network provider of the network.

Further according to the third aspect of the invention, before obtaining by the mobile station from the network the list of cells, the mobile station may be camped on a cell using a camp-on signal provided by the mobile station to the cell, wherein the cell optionally forwards a cell request signal containing a request for obtaining the list to the network.

Still further according to the third aspect of the invention, the choosing of the one cell from the list or optionally from the modified list may be based on ranking the cells according to the predetermined criterion.

According further to the third aspect of the invention, the reselecting the one cell may include: camping by the mobile station on the one cell using a further camp-on signal provided by the mobile station to the one cell; performing by the mobile station and by the network testing using the predetermined procedural criterion whether the one cell can be used for interconnecting the mobile station to the network; and connecting the mobile station to the network using the one cell if the predetermined procedural criterion is met.

According to a fourth aspect of the invention, a computer program product comprising: a computer readable storage structure embodying computer program code thereon for execution by a computer processor with the computer program code characterized in that it includes instructions for performing the steps of the first aspect of the invention, indicated as being performed by any component of the mobile station, the cells or the network.

According to a fifth aspect of the invention, a method for a cell reselection by a mobile station for interconnecting the mobile station to a network in a limited mobile access environment, comprises the steps of: obtaining by the mobile station from the network a list of cells located in a radio-sensitive geographical area of the mobile station for determining using a predetermined procedural criterion whether any of the cells can be used for interconnecting the mobile station to the network; and generating by the mobile station a modified list of cells from the list by removing forbidden access cells from the list and using one cell from the modified list, if the one cell meets a radio-based pre-selected criterion and if the predetermined procedural criterion is met for the one cell, for interconnecting the mobile station to the network in the limited mobile access environment.

According to a sixth aspect of the invention, a mobile station for interconnecting to a network in a limited mobile access environment using a cell reselection by a mobile station, comprises: a receiving/transmitting/processing module, responsive to a cell-list signal indicative of a list of cells located in a radio-sensitive geographical area of the mobile station, for providing a cell-list received signal indicative of the list of the cells; and a cell reselection block, responsive to the cell-list received signal, for generating a modified list of cells from the list by removing forbidden access cells from the list and for selecting one cell from the modified list if the one cell meets a radio-based pre-selected criterion, for providing a further camp-on originated signal which is used for camping of the mobile device on the one cell and determining if a predetermined procedural criterion is met for the one cell, thus providing interconnecting the mobile station to the network in the limited mobile access environment if the predetermined procedural criterion is met.

According to a seventh aspect of the invention, a cell reselection by a mobile station for interconnecting the mobile station to a network in a limited mobile access environment, comprises: a mobile station, responsive to a cell-list signal indicative of a list of M cells located in a radio-sensitive geographical area of the mobile station, for determining using a predetermined procedural criterion whether any of the cells can be used for interconnecting the mobile station to the network and optionally for generating a modified list of cells from the list by removing forbidden access cells from the list, and for using one cell from the modified list, if the one cell meets a radio-based pre-selected criterion and if the predetermined procedural criterion is met for the one cell, for interconnecting the mobile station to the network in the limited mobile access environment, wherein M is an integer of at least a value of two; K sub-networks containing the M cells in, wherein K is an integer of at least a value of one; and a network, for providing the cell-list signal.

Benefits of using the cell reselection for improving network interconnection include (but may not be limited to):

- minimizing loss of missing paging messages and interrupts to service due to unnecessary system information message reception on the other RAT (for shared RF receiver hardware solution), lowering out-of-service times and improving end user quality experience.
- increasing the standby time due to less measurements and evaluations to be performed;
- eliminating modifications to system information messages & thus eliminating changes for networks (this advantage holds for the case where this behavior is added as a default operation for the MS and behavior is not cell specific, i.e., instructed to the MS by the use of (Packet) System Information messages);
- retaining flexibility of mobile software implementation (i.e., this does not require the MS to read the target RAT system information during evaluation);
- retaining by the MS full control over the evaluation and cell reselection candidate selection procedures; and
- preventing repeated reselection attempts/suitability checks on cells that have forbidden LAIs during the lifetime of the entry on the "forbidden location areas for roaming" list.

BRIEF DESCRIPTION OF THE DRAWINGS

For a better understanding of the nature and objects of the present invention, reference is made to the following detailed description taken in conjunction with the following drawings, in which.

BEST MODE FOR CARRYING OUT THE INVENTION

Figure 1:
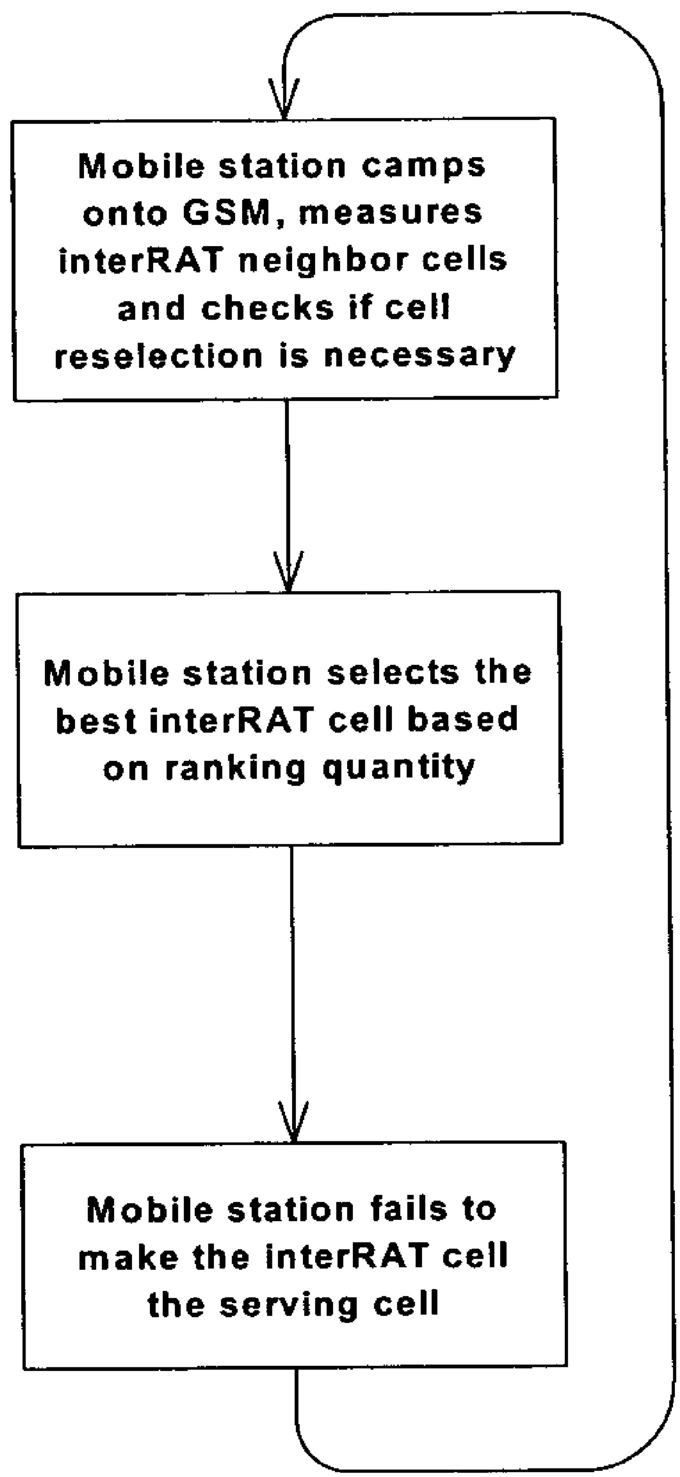
FIG. 1 is a flow chart illustrating how a mobile station is trying to reselect the same unsuitable cell, per prior art.
Figure 2:
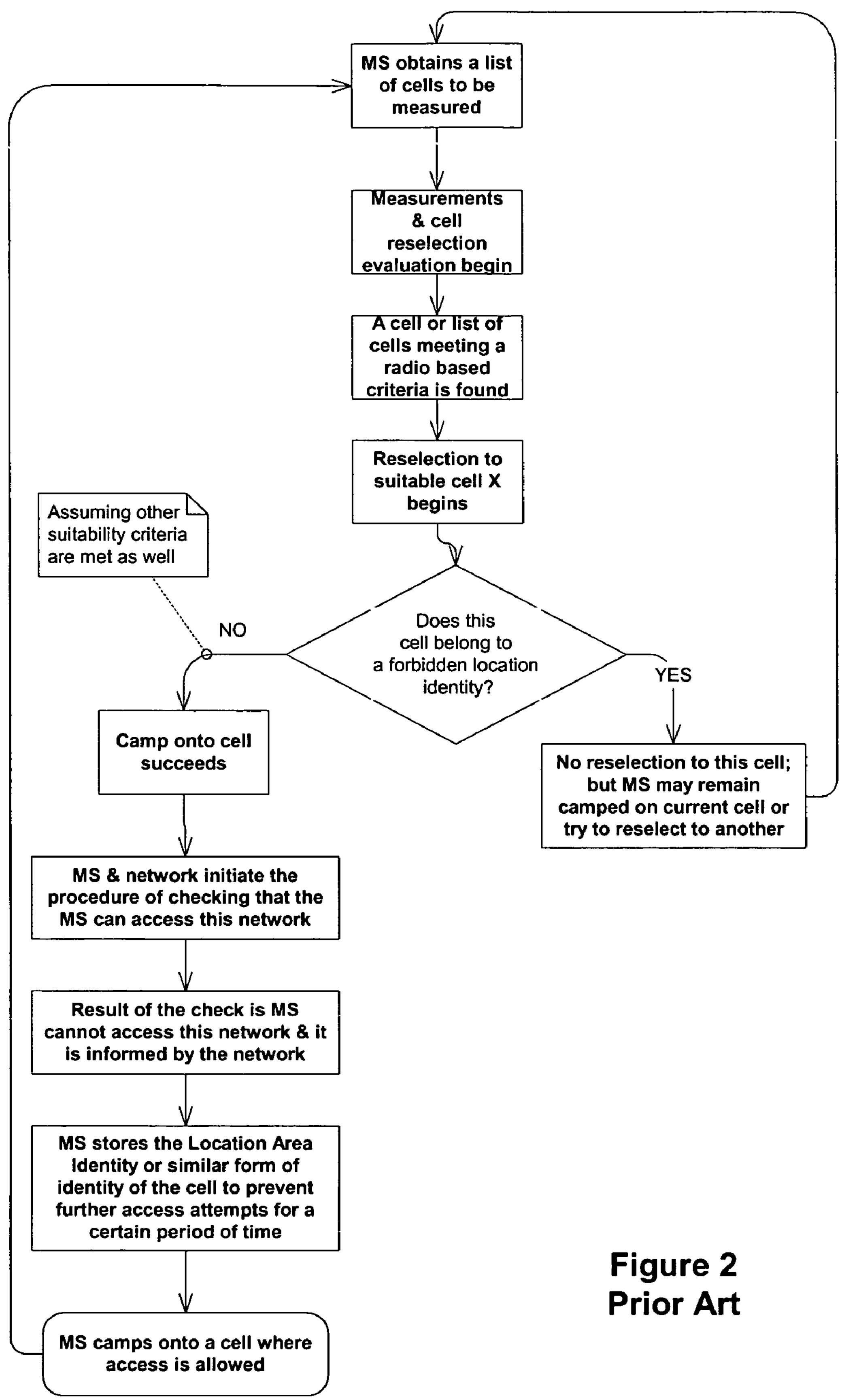
FIG. 2 is a flow chart illustrating how a mobile station is wasting resources in monitoring forbidden access cells, per prior art.

The present invention provides a new methodology for a cell reselection by a mobile station (MS) for improving network interconnection and interoperability in a limited mobile access environment. The present invention is applicable to any kind of networks and their interconnections. For example, it can be applied in the area of GSM/GPRS (general pocket radio service) and UTRAN interoperability or it can be applicable to interoperability between other intersystem technologies such as CDMA (code division multiple access) and WLAN (wireless local area network). A mobile station can be a mobile terminal, a user equipment, any type of a mobile communication device, a mobile phone, etc.

The invention describes how the MS can better recover from failed intersystem cell reselection attempts so that there are fewer subsequent failed attempts. The battery lifetime will be improved through the optimization of measurements and cell reselection evaluation algorithm. The solutions also lead to a better end user experience as there are less disruptions to data transfer connections and reduction in out-of-service times.

To overcome the described problems, two major milestones of the present invention are described below.

First, the MS takes into consideration during cell reselection evaluation and candidate-cell selection, whether the MS had previously been unsuccessful in reselecting the considered cell. Thus, in addition to using the specified ranking quantity used to define the best cell when there is more than one neighbor cell fulfilling the reselection criteria, the MS also considers if it had encountered problems in the past in trying to reselect that cell. This means treating neighbor cells to which the MS had failed reselection before with a lower priority in subsequent cell reselection evaluations. The present invention also describes how the priority can be restored back.

Second, the MS is allowed to stop monitoring and thus to stop evaluating cells if it was earlier found that the access to those cells is forbidden.

The solutions corresponding to these two major milestones of the present invention are further explained below.

The MS can fail to reselect a certain cell due to one of the following reasons:

1) The cell is barred (is not allowed to camp on by the MS);
2) The cell is not from an acceptable PLMN (public land mobile network);
3) The cell is from a forbidden Location Area (LA);
4) The cell is too weak (a cell selection criterion is not fulfilled);
5) Problems in reading the necessary (Packet) System Information ((P)SI) or System Information Blocks (SIB);
6) Problems in synchronizing with the cell; and
7) Random Access sending failure.

According to the present invention, the MS stores this information, e.g., by marking the failure cause in its internal data storage or SIM (subscriber identity module). Whatever the method of storage, the MS must be able to link this information to the particular cell on which the reselection failure happened. The MS can then use this information in the following ways during subsequent cell reselection evaluations:

1) Temporarily blocking the cell from reselection;
2) Adding a temporary offset for that cell to make it more difficult to reselect to this cell;
3) Temporarily stopping to monitor the cell for reselection; and
4) Adding a time limit when the MS may return to the cell for reselecting.

The information about how the MS shall handle such cells can be, for example:

1) Stating the behavior directly in the specification part used for a cell reselection evaluation; and/or
2) Informing the behavior in the system information sent by the network to the MS.

According to the present invention, in subsequent reselection evaluations, the MS can choose for reselecting another cell and evaluate it as a reselection candidate even if the previously attempted cell still exists as the best ranked reselection candidate and there are other cells that the MS has not attempted to reselect to. This solution does not require the network to control the MS behavior. If, however, there is no another cell for evaluation or where all previous reselection attempts to all other cells have failed, the MS can choose one of several actions:

1) If the current cell is still suitable for normal camping, the MS stays on that cell;

2) If the current cell is no longer suitable for normal camping, the MS can attempt reselection towards a cell even if that cell is marked with a failed camping indicator.

Alternatively, if the cell under evaluation is not marked with the failed camping indicator (and is otherwise evaluated as being suitable for the cell reselection according to the specification), the MS performs reselection towards the cell.

For a neighbor cell that has been marked with the camping failure indication, its priority as a reselection candidate can be restored, according to the present invention, to normal after a certain event, e.g., after a certain time or after performing a certain action. These events can be:

1) Timer controlled (this includes the time span from 0 to infinity);

2) The MS "reset" all information concerning the cell;

3) The cell is no longer a part of a cell neighbor list;

4) Successful camping on the cell has happened.

The present invention prevents the MS from trying to reselect the same problematic cell simply because it is the best-ranked cell, but allows the MS to reselect a lower ranked, but possibly, suitable cell that has also met the cell reselection criteria and may not result in the same camping failures. The cell reselection failure reasons mentioned above can be grouped under radio condition failures and cell access failures. Reselection failures due to poor radio conditions may be improved when the location of the MS changes and are thus not near-permanent or long-term failures. Reselection failures due to a forbidden cell access, on the other hand, are controlled by the network operator in limiting access to certain cells and cannot be improved by the MS location. The present invention will prevent the MS roaming in areas where it has no access to the best-ranked cell from attempting to reselect the same cell every time.

With regards to allowing the MS to stop monitoring forbidden access cells, e.g., in GSM/UTRAN networks, the MS gathers this information by attempting a location update on the cell, only to receive a Location Update Reject message with reject cause values #13 or #15. It then currently (per the prior art) lists the LAI (location area identity) on a "forbidden location areas for roaming" list, e.g., following the procedure described in "3rd Generation Partnership Project; Technical Specification Group Core Network; Mobile radio interface Layer 3 specification; Core network protocols; Stage 3", 3GPP TS 24.008 4.4.4.7. However, as it was explained in the Background Art section, the LAI information is not sufficient for uniquely identifying a cell. According to the present invention, the MS also stores the relevant cell information that can be used to identify the cell, so that it can stop measuring (monitoring) it. The list of "forbidden location areas for roaming" has a long lifetime in comparison to the cell reselection evaluation period, which is typically 5 seconds in many cases. According to "3rd Generation Partnership Project; Technical Specification Group Core Network; Mobile radio interface Layer 3 specification; Core network protocols; Stage 3", 3GPP TS 24.008 4.4.1, the "forbidden location areas for roaming" list is deleted when the MS is switched off or when the SIM is removed, or periodically (with period in the range 12 to 24 hours), or when the list is full and a new entry has to be inserted, the oldest entry is deleted. It is a waste of resources to monitor a cell as long as its LAI is listed on the list of "forbidden location areas for roaming", since the suitability criteria for the cell will not be met and thus the MS will not select this cell autonomously. It is also highly unlikely or even impossible that the operator will change the roaming access rights of a subscriber to such a cell on the fly. According to the present invention, the MS starts to monitor and evaluate cells from the forbidden location areas again when:

the Location Area Identities are removed from the "forbidden location areas for roaming" list; or access is allowed to a cell that was previously forbidden; or the MS enters a mode where autonomous cell reselection is not allowed and/or the MS is required to send measurement reports, e.g., GSM CS dedicated mode, GPRS NC2 mode.

Figure 3:
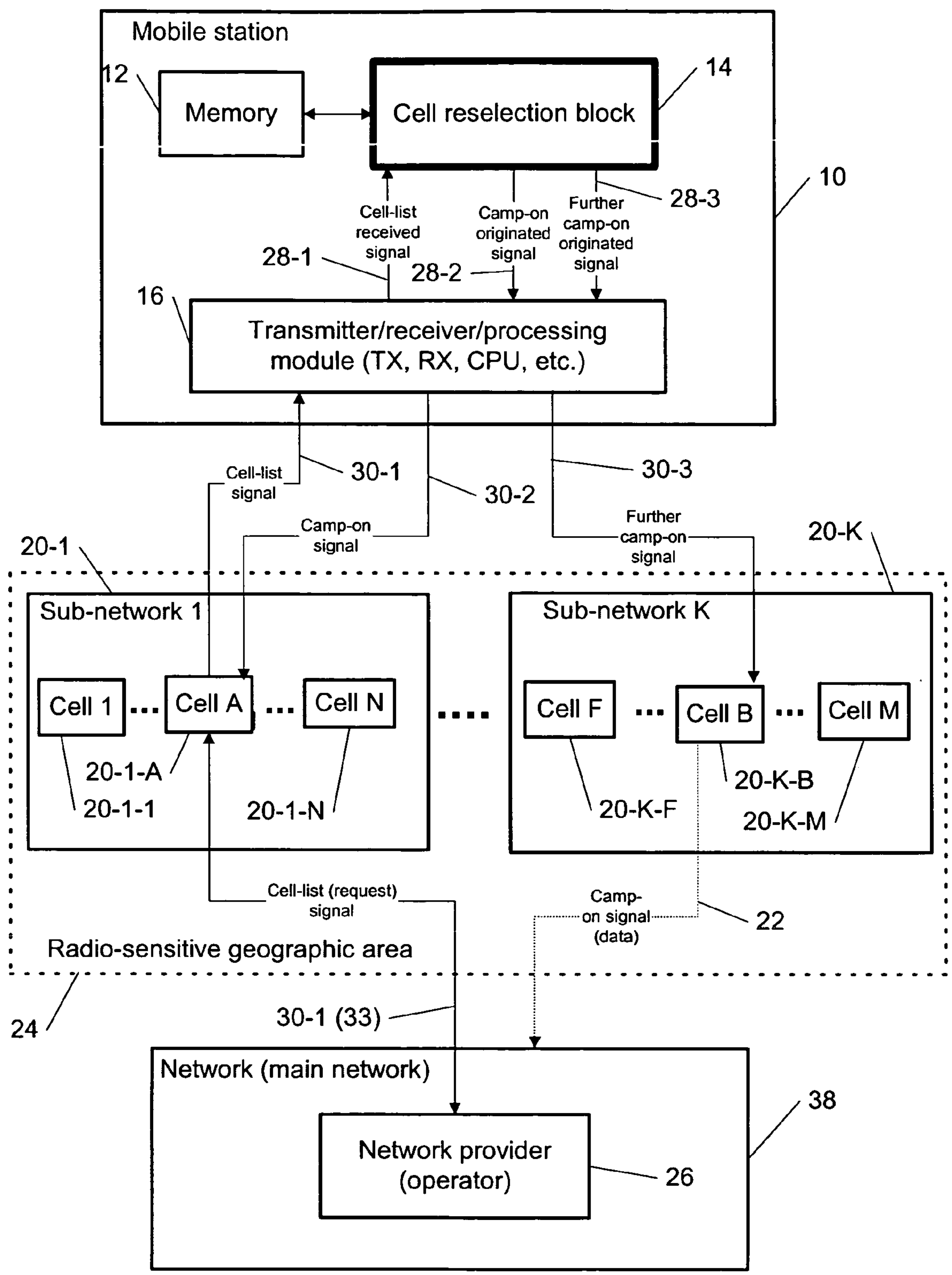
FIG. 3 is a system block diagram illustrating a cell selection by a mobile station for interconnecting the mobile station to a network in a limited mobile access environment, according to the present invention.

FIG. 3 shows an example, among many others, of a system block diagram illustrating a cell selection by a mobile station 10 for interconnecting the mobile station 10 to a network 38 in a limited mobile access environment, according to the present invention.

In the example of FIG. 3, the mobile station 10 comprises a cell reselection block 14, a memory 12 and a transmitter/receiver/processing module 16. The cell reselection block 14 is a key block for implementing the present invention and all steps performed by the mobile station 10 related to the cell reselection can be coordinated and originated by the cell reselection block 14. For example, as shown in FIG. 3, the cell reselection block 14 can generate a camp-on originated signal 28-2 and a further camp-on originated signal 28-3 to facilitate reselecting to a cell according to the algorithms described by the present invention described above and elaborated more below in regard to FIG. 4. Moreover, the cell reselection block 14 can be responsive to a cell-list receive signal 28-1 indicative of a list of cells located in a radio-sensitive geographical area of said mobile station 10, which is modified by the block 14 by removing forbidden access cells from said list, as described above. According to the present invention the block 14 can be implemented as a software or a hardware block or a combination thereof. Furthermore, the block 14 can be implemented as a separate block or can be combined with any other standard block of the mobile station 10. The cell reselection block 14 can store and retrieve the pertinent cell information described in the present invention using the memory 12. Again, the memory 12 can be implemented in a variety of different ways. It can be a part of a general memory of the mobile station 10 or it can be a separate dedicated area (e.g., subscriber identity module (SIM), etc.). Finally, the mobile station 10 contains a transmitter/receiver/processing block 16 which can be implemented in a plurality of ways, as well known in the art. Typically, the module 16 can include a transmitter, a receiver, a CPU, an I/O block, etc. Basically, the module 16 is for providing an effective communication of the cell reselection block 14 with the network as described in detail below. For example, the module 16 generates a camp-on signal 30-2 and a further camp-on signal 30-3 from the camp-on originated signal 28-2 and from the further camp-on originated signal 28-3, respectively. The module 16 also receives a cell-list signal 30-1 and converts it to the cell-list signal 28-1 provided to the cell reselection block 14.

FIG. 3 shows K sub-networks 20-1, 20-2, . . . , 20-K in a radio-sensitive geographic area 24 (containing total of M cells) for the mobile device 10. Each sub-network of these K sub-networks 20-1, 20-2, . . . , 20-K can contain a number of cells, e.g., a sub-network 20-1 contains N cells 20-1-1 . . . 20-1-A, . . . , 20-1-N, and sub-network 20-K contains M-F cells 20-K-F . . . 20-K-B, . . . , 20-K-M, wherein K is an integer of at least a value of one. A total number of cells in the radio-sensitive geographic area 24 is M, wherein M is an integer of at least a value of two. All of the sub-networks 20-1, 20-2, . . . , 20-K can be represented by various types of networks without any restriction in principle. For example, one of the sub-networks 20-1, 20-2, . . . , 20-K can be the GSM/GPRS; another sub-network out of the sub-networks 20-1, 20-2, . . . , 20-K can be UTRAN. As described below in regard to FIG. 4, the mobile station 10 can initially camp on, e.g., cell A (cell 20-1-A) of the sub-network 20-1 using the camp-on signal 30-2 for obtaining the cell-list information (this cell-list information can be broadcasted by the network 38), and later the mobile station 10 can camp (using the camp-on signal 30-3) on a cell chosen for the reselection, e.g., cell B (cell 20-K-B) of the sub-network 28-K.

The goal of the cell reselection performed by the mobile station 10 in FIG. 3 is to establish a valid and most effective connection with the network (or the main network) 38. The network 38 usually contains a network provider (or a network operator) 26, which provides the cell list signal 30-1, described above, in response to a cell-list request signal 33, provided to the block 26 by the cell 20-1-A (cell A) or alternatively this cell-list information can be broadcasted by the network 38.

Figure 4:
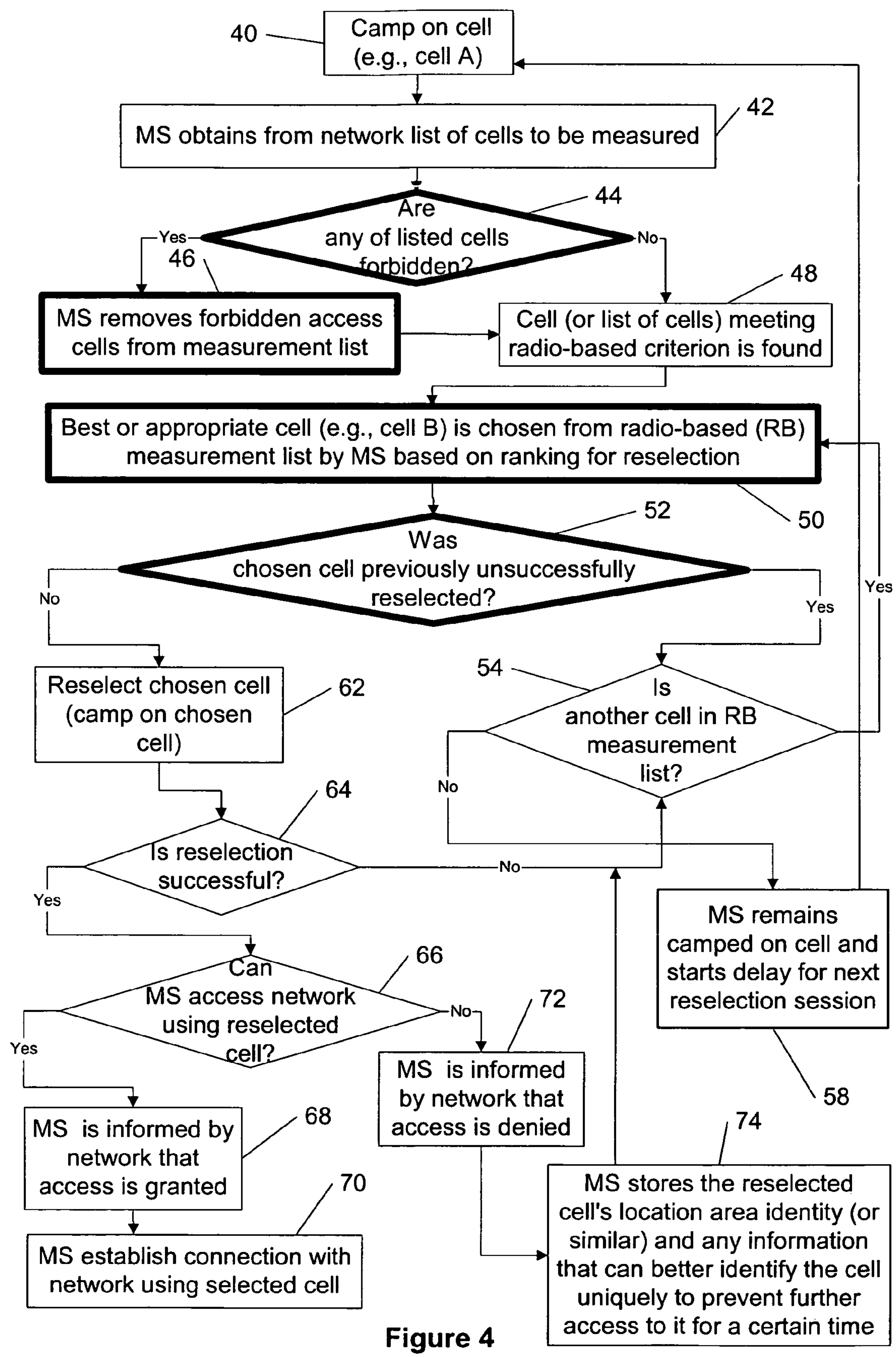
FIG. 4 is a flow chart illustrating a cell selection by a mobile station for interconnecting the mobile station to a network in a limited mobile access environment shown in FIG. 3, according to the present invention.

FIG. 4 shows a flow chart illustrating the cell selection by the mobile station 10 for interconnecting the mobile station 10 to the network 38 shown in FIG. 3 in the limited mobile access environment, according to the present invention.

The flow chart of FIG. 4 only represents one possible scenario among many others. In a method according to the present invention, in a first step 40, the mobile station 10 camps on a cell, e.g., on the cell A (the cell 20-1-A of the sub-network 20-1) which is facilitated by the camp-on signal 30-2 and explained above. The goal of step 40 is to initiate a procedure for getting from the network 38 a list of cells located in a radio-sensitive geographical area of said mobile station 10 to be monitored and measured for providing the interconnection of the mobile station 10 to the network 38. Thus camping on the cell A automatically includes sending a cell-list select signal 33 by the cell A to the network provider 26 of the network 38 requesting said cell list. In a next step 42, the mobile station obtains from the network 38 the cell-list signal 30-1 (transformed to the cell-list received signal 28-1) indicative of said list of cells to be monitored and measured and stores that cell list in the memory 12.

In a next step 44, it is determined by the mobile station 10 (e.g., by using the cell reselection block 14 interacting with the memory 12) whether there are any forbidden access cells in the cell list (or the measurement list). For the purpose of this invention, forbidden access cells can include a plurality of cells which cannot be reselected for a variety of reasons, e.g., cells being barred, cells being from an acceptable PLMN (public land mobile network), cells being from a forbidden Location Area (LA), cells being too weak, etc. The above reasons and rationale for defining this list of the forbidden access cells can be modified in time based on evolving technologies and standards.

If it is determined in step 44 that there are forbidden access cells in the cell list, in a next step 46, the mobile station 10 (using the cell reselection block 14 and the memory 12) removes the forbidden access cells from said list, thus generating a modified cell list to be monitored and measured and then the process proceeds to step 48. However, if it is determined that there are no forbidden access cells in the cell list, in a next step 48, the modified cell list is further narrowed down (in said mobile station 10) by identifying cells meeting a radio-based criterion to avoid the radio condition failures mentioned above by removing cells from the modified list which do not meet said radio-based criterion, thus modifying the modified list to a radio-based (RB) modified list.

In a next step 50, one cell (e.g., cell B 20-K-B of the sub-network 20-K) from the modified cell list meeting the radio-based criterion is chosen based on ranking for the reselection (thus, using a predetermined criterion). This ranking can be defined, for example, using the defining a ranking quantity, e.g., having the greatest received signal code power (RSCP) for the best cell, as specified in "3rd Generation Partnership Project; Technical Specification Group GSM/EDGE Radio Access Network; Radio subsystem link control", 3GPP TS 45.008, section 6.6.5, but a plurality of other methods and criteria for determining the cell ranking can be used. In a next step 52, it is checked by the mobile station 10 (e.g., using the cell reselection block 14) whether the cell B was previously unsuccessfully reselected for interconnecting the mobile station 10 to the network 38. If that is the case, the process goes to step 54. However, if it is determined that the cell B was not previously unsuccessfully reselected, the process goes to step 62.

In a step 54, it is determined whether there is another cell in said modified RB list for reselection. If that is the case, the process goes back to step 50. If, however, it is determined that there is no other cell in said modified RB list for reselection, in a next step 58, the mobile station remains camped on cell A after setting a time delay before starting a next reselection process towards the attempted cells and after said time delay goes back to step 40. In an alternative scenario, prior to step 58, if the mobile station 10 cannot camp on the cell A any longer, instead of performing step 58, the mobile station 10 can choose another cell (even previously unsuccessfully reselected, e.g., cell B) from the modified RB list and then go to step 62, described below.

In a step 62, the chosen cell B is reselected and the mobile station 10 camps on the cell B. In a next step 64, it is determined whether the reselection of the cell B (or camping on the cell B) is successful. If that is not the case (camping on the cell failed), the process goes to step 54 described above (or alternatively can go to step 40). However, if the reselection of the cell B is successful, in a next step 66, it is determined by the mobile station 10 and the network 38 using testing based on a predetermined procedural criterion, whether the mobile station 10 can access the network 38 using the reselected cell B: e.g., if the mobile station 10 managed to successfully camp onto cell B but a location update/registration to the network 38 can be rejected by the network 38 due to the forbidden access (for instance, by indicating the reject cause values #13 or #15 in the reply). If the access to the network 38 is denied in step 66, in a next step 72, the mobile station 10 is informed by the network 38 that the access is denied, which is followed by step 74, wherein the mobile station 10 stores location area identity (or similar identity information for the cell B) of the reselected cell B and information that can uniquely identify that cell, e.g., for a GSM cell, it can be a frequency, and/or a BSIC (Base Station Identifier Code) and/or, if available, a CGI (Cell Global Identification) to prevent further access to it, e.g., for a certain time (restoring the access to cell B can be implemented using the procedures described above, according to the present invention).

However, if it is determined in step 66 that the access in not denied, in a next step 68, the mobile station 10 is informed by the network 38 that the access is granted. Finally in a step 70, the mobile station 10 establish the desired connection with the network 38 using the selected cell B.

What is claimed is:

1. A method, comprising:

stop monitoring cells for a cell reselection by a mobile station if access to said cells is forbidden, and storing an identity of said cells as forbidden cells by the mobile station;

receiving by the mobile station from a network a cell-list signal indicative of a list of cells located in a radio-sensitive geographical area of said mobile station;

generating by said mobile station a modified list of cells by removing from said list, if available, forbidden access cells contained among said forbidden cells;

choosing one cell from said modified list using a predetermined criterion, wherein said one cell meets a radio-based pre-selected criterion;

checking by said mobile station if said one cell was previously unsuccessfully reselected for connecting the mobile station to the network; and reselecting said one cell after determining that a predetermined procedural criterion for connecting said mobile station using a cell to the network is met for said one cell and if said one cell was not previously unsuccessfully reselected, and using said one cell by said mobile station for connecting said mobile station to a network in a limited mobile access environment.

2. The method of claim 1, wherein said stop monitoring, said receiving, said generating, said choosing, said checking and said reselecting are coordinated by a cell reselection block of said mobile station.

3. The method of claim 1, wherein before said receiving by said mobile station from said network said list of cells, the method comprises:

camping by said mobile station on a cell from said radio-sensitive geographical area using a camp-on signal provided by said mobile station to said cell, wherein said cell is used for obtaining said list from said network by said mobile device.

4. The method of claim 1, wherein before said choosing said one cell, the method comprises:

narrowing down by said mobile station said modified list by removing cells from said modified list which do not meet said radio-based criterion.

5. The method of claim 4, wherein said choosing of said one cell from said modified list is based on ranking said cells according to said predetermined criterion.

6. The method of claim 1, wherein said reselecting said one cell comprises:

camping by said mobile station on said one cell using a further camp-on signal provided by said mobile station to said one cell;

performing by said mobile station and by said network testing using said predetermined procedural criterion whether said one cell is configured for connecting said mobile station to said network; and connecting said mobile station to said network using said one cell if said predetermined procedural criterion is met.

7. The method of claim 1, wherein if said one cell does not meet said predetermined procedural criterion, the method further comprises:

choosing a further cell from said modified list using a predetermined criterion, wherein said further cell meets a radio-based pre-selected criterion;

checking by said mobile station if said further cell was previously unsuccessfully reselected for connecting the mobile station to the network; and reselecting said further cell if said one cell was not previously unsuccessfully reselected, and after said determining, if said predetermined procedural criterion is met for said further cell, using said further cell by said mobile station for connecting said mobile station to said network in said limited mobile access environment.

8. The method of claim 1, wherein if said one cell does not meet said predetermined procedural criterion, the method further comprises:

storing by said mobile station cell identity information for said one cell to prevent said choosing of said one cell based on a predetermined rejection criterion permanently or during a predetermined time period, wherein said cell identity information comprises at least one of: cell information uniquely identifying said one cell and a location area identity of said one cell.

9. The method of claim 8, further comprising:

removing from said storing said cell identity information of said one cell by said mobile station if said predetermined rejection criterion is no longer applied after said predetermined time period.

10. A computer program product comprising: a computer readable storage structure embodying computer program code thereon for execution by a computer processor with said computer program code, wherein said computer program code comprises instructions for performing the method of claim 1, indicated as being performed by any component or a combination of components of said mobile station, said cells or said network.

11. A mobile station, comprising: a memory, configured to store an identity of cells as forbidden cells after stopping monitoring said cells for a cell reselection by said mobile station if access to said cells is forbidden;

a receiving/transmitting/processing module, responsive to a cell-list signal indicative of a list of cells located in a radio-sensitive geographical area of a mobile station, configured to provide a cell-list received signal indicative of said list of said cells;

a cell reselection block, responsive to said cell-list received signal, configured to generate a modified list of cells from said list by removing from said list, if available, forbidden access cells contained among said forbidden cells, configured to choose one cell from said modified list using a predetermined criterion, wherein said one cell meets a radio-based pre-selected criterion, configured to reselect said one cell if said one cell was not previously unsuccessfully reselected, wherein, after determining that a predetermined procedural criterion for connecting said mobile station using a cell to a network is met for said one cell and if said one cell was not previously unsuccessfully reselected, said mobile station is configured to use said one cell for connecting said mobile station to said network in a limited mobile access environment.

12. The mobile station of claim 11, wherein before receiving said cell-list signal containing said list of cells, said cell reselection block is configured to provide a camp-on originated signal which is transformed to a camp-on signal by said receiving/transmitting/processing module and said mobile device is configured to use said camp-on signal for camping of said mobile device on a cell from said radio-sensitive geographical area for obtaining said list from said network by said mobile device.

13. The mobile station of claim 12, wherein before said choosing said one cell, said cell reselection block is configured to narrow down said modified list by removing cells or from said modified list which do not meet said radio-based criterion.

14. The mobile station of claim 11, wherein said cell reselection block further configured to provide a further camp-on originated signal which is transformed to a further camp-on signal by said receiving/transmitting/processing module and said mobile device is configured to use said further camp-on signal to camp said mobile device on said one cell for performing by said mobile station, using said cell reselection block, and by said network testing based on said predetermined procedural criterion whether said one cell is configured for connecting said mobile station to said network.

15. The mobile station of claim 11, wherein if said one cell does not meet said predetermined procedural criterion, said cell reselection block is configured to choose a further cell from said modified list using a predetermined criterion, wherein said further cell meets a radio-based pre-selected criterion, and to reselect said further cell if said further cell was not previously unsuccessfully reselected, and wherein, after said determining indicating that said predetermined procedural criterion is met for said further cell, said mobile station is configured to use said further cell for connecting said mobile station to said network in said limited mobile access environment.

16. The mobile station of claim 11, wherein said memory is further configured to store said list, said modified list and information on forbidden access cells.

17. The mobile station of claim 11, wherein the cell reselection block is configured to choose said one cell from said modified list using ranking said cells according to said predetermined criterion, wherein said memory is configured to store said ranking information.

18. The mobile station of claim 11, wherein, if said one cell does not meet said predetermined procedural criterion, said memory is configured to store cell identity information of said one cell to prevent said choosing of said one cell based on a predetermined rejection criterion permanently or during a predetermined time period, wherein said cell identity information comprises at least one of: cell information uniquely identifying said one cell and a location area identity of said one cell.

19. The mobile station of claim 18, wherein said cell identity information of said one cell is removed from said memory if said predetermined rejection criterion is no longer applied after said predetermined time period.

20. A mobile station, comprising:

means for storing an identity of cells as forbidden cells after stopping monitoring said cells for a cell reselection by said mobile station if access to said cells is forbidden;

means for transmitting and receiving, responsive to a cell-list signal indicative of a list of cells located in a radio-sensitive geographical area of a mobile station, for providing a cell-list received signal indicative of said list of said cells;

means for cell reselection, responsive to said cell-list received signal, for generating a modified list of cells from said list by removing from said list, if available, forbidden access cells contained among said forbidden cells, for choosing one cell from said modified list using a predetermined criterion, wherein said one cell meets a radio-based pre-selected criterion, for reselecting said one cell if said one cell was not previously unsuccessfully reselected, wherein, after said determining indicating that a predetermined procedural criterion for connecting said mobile station using a cell to a network is met for said one cell and if said one cell was not previously unsuccessfully reselected, said mobile station is configured to use said one cell for connecting said mobile station to said network in a limited mobile access environment.

21. A mobile station of claim 20, wherein said means for storing is further configured to store said list, said modified list and information on forbidden access cells.

* * * * *